US010635113B2

(12) United States Patent
Pfaff et al.

(10) Patent No.: US 10,635,113 B2
(45) Date of Patent: Apr. 28, 2020

(54) AUTOMATED GUIDED VEHICLE AND METHOD OF OPERATING

(71) Applicant: KUKA Deutschland GmbH, Augsburg (DE)

(72) Inventors: Patrick Pfaff, Augsburg (DE); Bjoern Klein, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 142 days.

(21) Appl. No.: 15/329,825

(22) PCT Filed: Jul. 23, 2015

(86) PCT No.: PCT/EP2015/066894
§ 371 (c)(1),
(2) Date: Jan. 27, 2017

(87) PCT Pub. No.: WO2016/016089
PCT Pub. Date: Feb. 4, 2016

(65) Prior Publication Data
US 2017/0248961 A1    Aug. 31, 2017

(30) Foreign Application Priority Data
Jul. 29, 2014   (DE) .......................... 10 2014 214 889

(51) Int. Cl.
  *G05D 1/02*    (2020.01)
(52) U.S. Cl.
  CPC ........... *G05D 1/0225* (2013.01); *G05D 1/024* (2013.01); *G05D 2201/0216* (2013.01)
(58) Field of Classification Search
  CPC ................. G05D 1/0225; G05D 1/024; G05D 2201/0216

(Continued)

(56) References Cited

U.S. PATENT DOCUMENTS

| 5,764,014 A | * | 6/1998 | Jakeway | ................ | G05D 1/027 318/587 |
| 2008/0199298 A1 | * | 8/2008 | Chilson | ............... | B60L 15/2036 414/809 |

(Continued)

FOREIGN PATENT DOCUMENTS

| DE | 1020-10012750 | * | 9/2011 |
| DE | 102010012750 A1 | | 9/2011 |
| EP | 0788044 A1 | | 8/1997 |

OTHER PUBLICATIONS

Donald et al., "Kinodynannic motion Planning", Nov. 1993, Journal of the Association for Computing Machinery, vol. 40, No. 5, pp. 1048-1066.*

(Continued)

*Primary Examiner* — Muhammad Shafi
(74) *Attorney, Agent, or Firm* — Dorton & Willis, LLP

(57) ABSTRACT

A method of moving an automated guided vehicle (AGV) to a target position relative to an object having two characteristic features, wherein the target position lies on a connecting line between the two characteristic features or is located at a distance from the connecting line. The method includes moving the AGV to a position where distances to the characteristic features can be determined; determining a first distance between the current position and the first characteristic feature, and a second distance between the current position and the second characteristic feature; automatically moving the AGV in translation with a superposed first rotation, wherein the direction of the first rotation depends on the first and second distances; and automatically moving the AGV in translation with a superposed second rotation, wherein the second rotation is opposite in direction to the first rotation. The steps are repeated until a termination condition is satisfied.

9 Claims, 4 Drawing Sheets

(58) Field of Classification Search
USPC .......................................................... 701/23
See application file for complete search history.

(56) References Cited

U.S. PATENT DOCUMENTS

2009/0202335 A1* 8/2009 Trebbi ...................... A61L 2/07
 414/801
2017/0192438 A1* 7/2017 Morimoto ............. B60W 40/13

OTHER PUBLICATIONS

Goolgle search of "physical characterictic Science", Nov. 16, 2019.*
European Patent Office; Search Report and Written Opinion in International Patent Application No. PCT/EP2015/066894 dated Oct. 26, 2015; 9 pages.
Roland Stahn et al: "Laser Scanner-Based Navigation for Commercial Vehicles", Intelligent Vehicles Symposium, 2007 IEEE, IEEE, PI, Jun. 1, 2007, pp. 969-974, XP031127072, ISBN: 978-1-4244-1067-5.
European Patent Office; Office Action in related European Patent Application No. 15 741 203.2 dated Sep. 10, 2019; 6 pages.

* cited by examiner

AUTOMATED GUIDED VEHICLE AND METHOD OF OPERATING

CROSS-REFERENCE

This application is a national phase application under 35 U.S.C. § 371 of International Patent Application No. PCT/EP2015/066894 filed Jul. 23, 2015 (pending), which claims the benefit of German Patent Application No. DE 10 2014 214 889.8 filed Jul. 29, 2014, the disclosures of which are incorporated by reference herein in their entirety.

TECHNICAL FIELD

The invention relates to an automated guided vehicle (driverless transport vehicle), and a method of operating an automated guided vehicle.

BACKGROUND

An automated guided vehicle (AGV) is a ground-operated transport means having its own drive means, which vehicle travels under automatic control and without a hands-on driver. In particular, an automated guided vehicle can be configured so as to travel automatically to a target position relative to an object.

An object of the present invention is to establish conditions which enable an automated guided vehicle to automatically travel to a target position relative to an object.

SUMMARY

The underlying problem of the invention is solved by a method of operating an automated guided vehicle which vehicle is intended to travel automatically to a target position relative to an object, which object has two characteristic features, and the target position lies on the connecting line between the two characteristic features or lies at a distance from said connecting line, wherein the said method has the following method steps:
(a) Moving the automated guided vehicle to a position at which the automated guided vehicle is capable of determining, via the associated distance measuring device of said automated guided vehicle, a first distance between the current position of the automated guided vehicle and the first characteristic feature, and a second distance (b) between the current position of the automated guided vehicle and the second characteristic feature;
(b) Determining the first distance and the second distance, by means of the distance measuring device;
(c) Then, automatically moving the automated guided vehicle for a predetermined first time interval in a translational movement over which a first rotational movement is superposed, with the direction of the rotational movement depending on the first distance and the second distance;
(d) Following expiration of the first time interval, automatically moving the automated guided vehicle for a predetermined second time interval with the translational movement over which a second rotational movement is superposed, said second rotational movement being in the direction opposite to the first rotational movement; and
(e) Repeating Steps (b) through (d), until a termination condition (termination criterion) is satisfied.

A second aspect of the invention relates to an automated guided vehicle comprised of a vehicle body, and wheels disposed on the vehicle body, at least one of which wheels is associated with a drive means, said Vehicle being further comprised of a distance measuring device and a control apparatus which is connected to the distance measuring device and the drive means, which automated guided vehicle is configured so as to carry out the inventive method. The drive means is preferably an electric drive, particularly a controlled electric drive.

The automated guided vehicle may be in the form of, e.g., an omnidirectionally movable (holonomic) automated guided vehicle. In this case, the automated guided vehicle has omnidirectional wheels, preferably so-called Mecanum wheels, the drive means of which are controlled by the control apparatus.

The two characteristic features can be realized as a first characteristic features group and a second characteristic features group, with preferably these groups being symmetric.

The automated guided vehicle is preferably moved to the position by automatic travel. This is accomplished, e.g. by means of information stored in the control apparatus concerning a "lookup position" which enables the automated guided vehicle to determine the two characteristic features by means of the distance measuring device. The position is determined, e.g., automatically, by means of a programmed procedure.

The distance measuring device is preferably in the form of a laser scanner.

In order for the automated guided vehicle to automatically travel to the target position in a manner such that it will have a prescribed orientation, first the two distances are determined by means of the distance measuring device, the two distances being namely the distances between the current position of the automated guided vehicle and the respective two characteristic features of the object. These distances are preferably distances between the distance measuring device and the characteristic features.

The target position lies on the connecting line which connects the two characteristic features (thus between the two characteristic features), or at a distance from said connecting line.

To at least move closer to the target position, the automated guided vehicle is automatically moved (particularly under the control of its control apparatus) for the predetermined time interval, with the translational movement onto which the first rotational movement is superposed. The automated guided vehicle thus travels through a curved path. The direction of the first rotational movement depends on the first distance and the second distance, and particularly it depends on the difference between these two distances.

Following expiration of the first time interval, the automated guided vehicle travels for the second time interval, with the second rotational movement being in the opposite direction.

After the second time interval expires, the two distances (namely the distances between the current position of the automated guided vehicle and the two respective characteristic features) are re-determined, and the automated guided vehicle travels farther in the translational movement over which the newly determined rotational movement is superposed—until the termination criterion is satisfied. The termination criterion is selected such that the automated guided vehicle reaches the target position with a sufficiently small tolerance, and possibly (optionally) with a sufficiently accurate orientation with respect to the object.

Preferably, the first time interval and second time interval have the same length. The speed of the translational movement may be constant. Preferably, the distance between the target position and the first characteristic feature is equal to the distance between the target position and the second characteristic feature.

According to a variant of the inventive method, a first offset between the current position of the automated guided vehicle and the target position in the direction of the connecting line is determined. The direction of the first rotational movement is then established based on the determined first offset, so that the first rotational movement is also directed toward the target position. If, e.g., the current position of the automated guided vehicle is leftward of the target position, a rightward direction of rotation for the first rotational movement will be chosen, whereby the automated guided vehicle will first move along a curved path in the clockwise direction.

The speed of the first rotational movement and/or the second rotational movement may preferably depend on the magnitude of the described first offset and/or on the distance from the automated guided vehicle to the connecting line. In particular, it may be provided that the speed of the first rotational movement is greater when the described first offset is greater and/or the distance from the automated guided vehicle to the connecting line is greater. The speeds of the two rotational movements may be the same (equal).

The speed of the first rotational movement and/or the second rotational movement may also depend on the orientation of the automated guided vehicle in its current position, relative to the target position.

According to a preferred embodiment of the inventive method, the termination criterion is defined by the lengths of the first distance and the second distance on a circle with radius r around the center point of the automated guided vehicle and through the center point of the distance measuring device, wherewith the automated guided vehicle stops automatically when the equation of the circle, $$r^2 = x^2 + y^2$$

is satisfied for a first desired offset (distance) $x = x_{offset,desired}$ and a second desired offset (distance) $y = y_{offset,desired}$. The first desired offset (distance) represents a maximum allowed offset from the automated guided vehicle to the target position parallel to the connecting line, and the second desired offset (distance) represents a maximum allowed offset from the automated guided vehicle to the target position perpendicularly to the connecting line. In this way, the automated guided vehicle can arrive at the target position with an orientation of said vehicle which is sufficiently close to the desired orientation relative to the object.

According to a variant of the inventive method, the object is in the form of a cargo trailer, which has a trailer coupling means which is configured to be releasably connectable to a corresponding tractor coupling means of the automated guided vehicle. In particular, the cargo trailer has two vertical rods extending in the longitudinal direction of the cargo trailer, wherewith the edges of said rods which are directed toward the trailer coupling means comprise the two characterizing features. In particular, the disposition of the trailer coupling means is associated with the target position. According to this variant it is possible for the automated guided vehicle to travel automatically toward the cargo trailer in a manner such that said vehicle can automatically contact the trailer coupling means of the cargo trailer. Thus the automated guided vehicle, by means of its distance measuring device, can detect the two forward edges, so that, based on the distances between the automated guided vehicle, particularly its distance measuring device, and the two forward edges, it can determine the directions of the two respective rotational movements.

Thus, an additional aspect of the invention relates to a vehicle arrangement comprised of an automated guided vehicle and a cargo trailer. The automated guided vehicle is comprised of a vehicle body, and wheels disposed on the vehicle body, at least one of which wheels is associated with a drive means, and said Vehicle is further comprised of a distance measuring device and a control apparatus connected to the distance measuring device and the drive means, which automated guided vehicle is configured so as to carry out the inventive method. The cargo trailer is comprised of a trailer coupling means which is configured to be releasably connectable to a corresponding tractor coupling means of the automated guided vehicle, wherein the cargo trailer has in particular two vertical rods extending in the longitudinal direction of the cargo trailer, wherewith the edges of said rods which are directed toward the trailer coupling means comprise the two characterizing features.

The cargo trailer may also have two groups of "feet" or rods, preferably extending in the longitudinal direction of the cargo trailer. The edges of the rods which edges are directed toward the trailer coupling device, or the sides of the "feet" which are directed toward the trailer coupling device, form the two groups of characterizing features.

According to another preferred embodiment of the inventive method, the object is in the form of an autoclave, which is generally a certain space. The autoclave, or space, has a rear wall, a first side wall, and a second side wall parallel to the first side wall. The rear wall is disposed perpendicularly to the side walls, wherewith the first side wall and the rear wall form a first rear corner, and the second side wall and the rear wall form a second rear corner, wherewith the forward edges of the two side walls which are directed away from the rear wall form an opening in the autoclave, through which opening the automated guided vehicle automatically travels into the autoclave or space, and wherewith the two rear corners form the two described characteristic features. On the basis of this variant, the automated guided vehicle can travel through the opening and into the autoclave or space, in order to achieve, e.g., alignment and combining (coupling) of said vehicle.

Related to this, an additional aspect of the invention relates to an apparatus for aligning and combining (coupling), employing an autoclave, which apparatus is comprised of an automated guided vehicle and an autoclave. The automated guided vehicle is comprised of a vehicle body, and wheels disposed on the vehicle body, at least one of which wheels is associated with a drive means, and said vehicle is further comprised of a distance measuring device and a control apparatus which is connected to the distance measuring device and the drive means, which automated guided vehicle is configured so as to carry out the inventive method. The autoclave is comprised of a rear wall, a first side wall, and a second side wall which is parallel to the first side wall, wherewith the rear wall is disposed perpendicularly to the side walls, wherewith the first side wall and the rear wall form a first rear corner, and the second side wall and the rear wall form a second rear corner, wherein the forward edges of the two side walls which are directed away from the rear wall form an opening in the autoclave, through which opening the automated guided vehicle automatically travels into the autoclave, and wherein the two rear corners form the two described characteristic features.

BRIEF DESCRIPTION OF THE DRAWINGS

Exemplary embodiments of the invention are presented in the accompanying schematic drawings.

DETAILED DESCRIPTION

Figure 1:
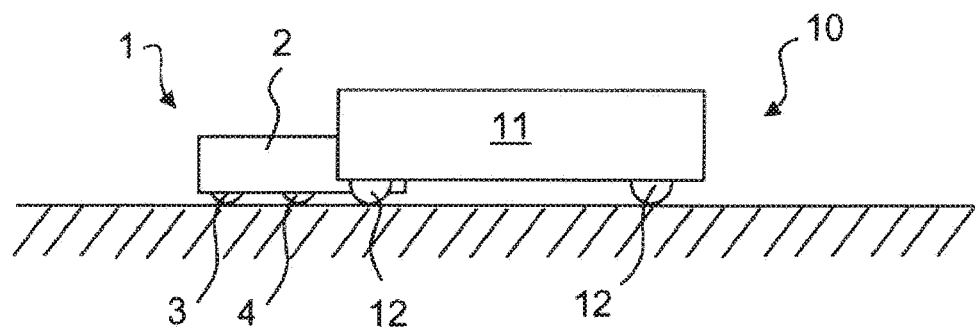
FIG. 1 is a lateral view of an automated guided vehicle with a cargo trailer.
Figure 2:
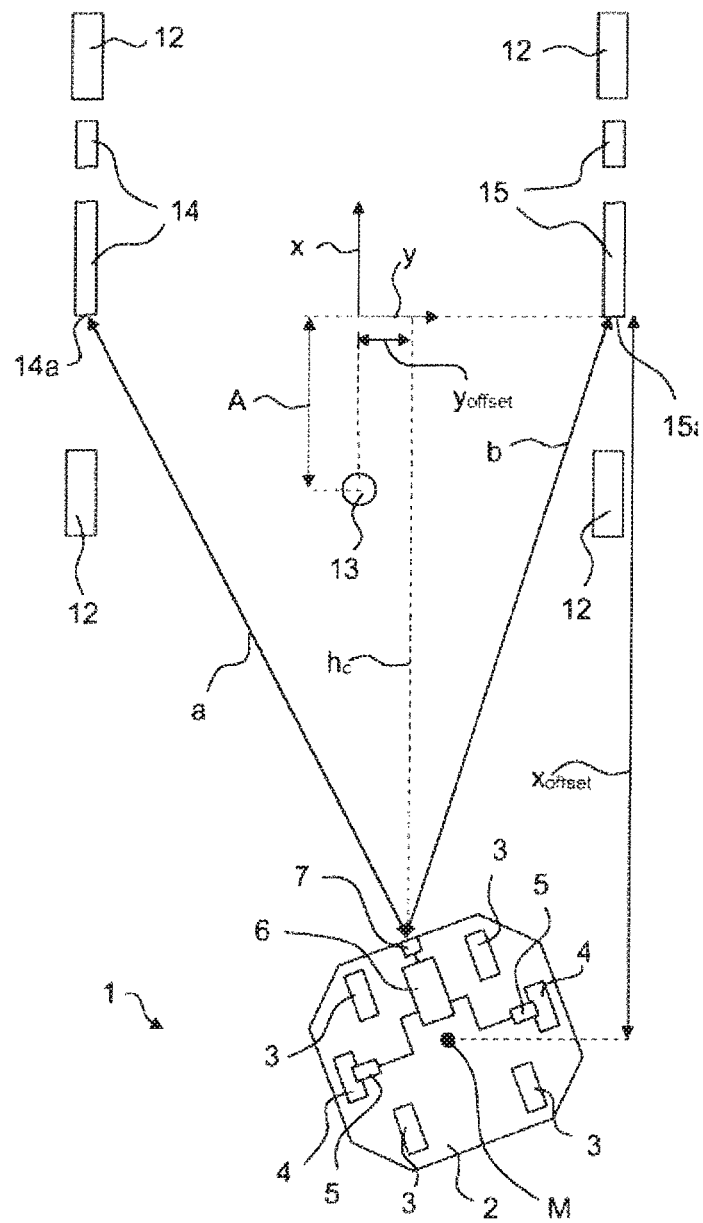
FIG. 2 is a plan view of an automated guided vehicle, along with a part of the cargo trailer.

FIG. 1 shows a lateral view of an automated guided vehicle 1 which is towing a cargo trailer 10. FIG. 2 illustrates a plan view of the automated guided vehicle 1, along with a part of the cargo trailer 10.

In the case of the present exemplary embodiment, the automated guided vehicle 1 is comprised of a vehicle body 2 and a plurality of wheels 3 which are attached to the vehicle body 2 by means of suspensions (not illustrated).

Further, in the case of the present exemplary embodiment of the automated guided vehicle, two additional wheels 4 are provided, each of which may have its own drive means 5. The additional wheels 4 are also attached to the vehicle body 2 by means of suspensions (not illustrated). The drive means 5 may be in particular electric drives, preferably electric drives which are controlled. The axes of the additional wheels 4 are disposed on a common line which extends through the center point M of the automated guided vehicle 1.

The automated guided vehicle 1 is further comprised of a control apparatus 6, which is disposed, e.g., on the vehicle body 2, and which is connected to the drive means 5, in order to control said drive means for automatic travel of the automated guided vehicle 1. For this purpose, e.g. a suitable computer program runs on the control apparatus 6. In particular it is provided that the two drives 5 can be driven individually, whereby it is possible to drive the automated guided vehicle 1 not only in a straight line but to superpose rotational movement over the translational movement of the vehicle. In particular, the automated guided vehicle 1 is configured so as to be able to rotate around its center point M.

The automated guided vehicle 1 is further comprised of a distance measuring device 7, e.g. in the form of a laser scanner, which is connected to the control apparatus 6. The distance measuring device 7 is disposed, e.g., on the vehicle body 2 and is designed to determine the distance from the automated guided vehicle 1 to an object. The signals generated by the distance measuring device 7 are transmitted to the control apparatus 6, providing the latter with information concerning the said distance.

In the case of the present exemplary embodiment, the cargo trailer 10 is comprised of a trailer body 11 to which a plurality of wheels 12 are attached, e.g. by means of suspensions (not illustrated). Further, the trailer 10 has a trailer coupling means 13 which is designed to releasably connect (join) to a tractor coupling means (not illustrated) on the automated guided vehicle 1, so that the latter can tow the cargo trailer 10 when the tractor coupling means is coupled to the trailer coupling means 13. The tractor coupling means comprises, e.g., a lifting device which is controllable by the control apparatus 6, to enable the automated guided vehicle 1 to couple the tractor coupling means to the trailer coupling means 13.

In the case of the present exemplary embodiment, the trailer 10 has a first vertical rod 14 and a second vertical rod 15, the forward edges of which (the first forward edge 14a, of the first vertical rod 14, and the second forward edge 15, of the second vertical rod 15) are disposed facing the trailer coupling means 13, and, when the automated guided vehicle 1 is located ahead of the cargo trailer 10, these rods can be detected by the distance measuring device 7.

The two vertical rods 14, 15 extend in the longitudinal direction (x direction) of the trailer 10, thus from front to rear. The two vertical rods 14, 15 are disposed in particular between the wheels 12.

The trailer coupling means 13 is disposed centrally in the transverse direction (y direction) of the trailer 10. The two forward edges 14a, 15a are disposed at the same height with reference to the longitudinal direction of the automated guided vehicle 1. In the case of the present exemplary embodiment, the trailer coupling means 13 is disposed at a distance A from the two forward edges 14a, 15a.

If the automated guided vehicle 1 is located at a sufficiently close distance ahead of the trailer 10, it is possible to measure a first distance a and a second distance b by means of the distance measuring device 7. The first distance a is the distance between the automated guided vehicle 1 and the first forward edge 14a, or the distance between the distance measuring device 7 and the first forward edge 14a. The second distance b is the distance between the automated guided vehicle 1 and the second forward edge 15a, or the distance between the distance measuring device 7 and the second forward edge 15a.

Figure 4:
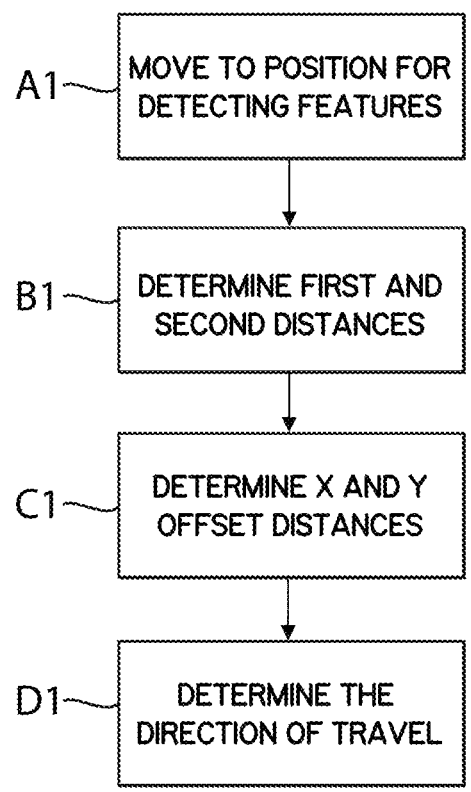
FIG. 4 is a flow diagram representing the automated travel of the automated guided vehicle.

In the case of the present exemplary embodiment, it is provided that the automated guided vehicle 1 automatically approaches the trailer 10 to enable the automated guided vehicle 1 to become coupled to the trailer coupling means 13 of the trailer 10, in particular to automatically become so coupled. Thus, the automated guided vehicle 1 is designed such that it is capable of automatically moving to a predetermined target position relative to the trailer 10, wherewith in particular at this target position it assumes a predetermined orientation with respect to the trailer 10. This is accomplished as follows, in the case of the present exemplary embodiment:

First, the automated guided vehicle 1 moves to a position close to the trailer 10, by, preferably, assuming a predetermined position by automatic means; this is represented by Step A1 in the flow diagram of FIG. 4. This movement is accomplished by the automated guided vehicle 1, e.g. by means of a programmed procedure which is programmed into the control apparatus 6. The predetermined position is selected such that the automated guided vehicle 1 can detect two characteristic features of the trailer 10 by means of its distance measuring device 7. In the case of the present exemplary embodiment, these two characteristic features are the two forward edges 14a, 15a.

When the automated guided vehicle 1 reaches the position in question, it automatically looks for the two characteristic features by means of its distance measuring device 7, which features in the case of the present exemplary embodiment are the two forward edges 14a, 15a of the two vertical rods 14, 15, and it determines the first distance a and the second distance b, which are the distances to the respective edges 14, 15; this is represented by Step B1 of the flow diagram of FIG. 4. This also enables determination of the distance $h_c$ from the automated guided vehicle 1 to the connecting line of the two forward edges 14a, 14b.

In the case of the present exemplary embodiment, the distance measuring device is 7 in the form of a laser scanner, which emits a laser beam (not illustrated, but in principle familiar to one skilled in the art). For calculation of the two distances a, b, in the case of the present exemplary embodiment, the two innermost detected laser beams are employed (from the left and from the right).

Using the first distance a, the second distance b, and the distance between the two forward edges 14a, 15a, in the case of the present exemplary embodiment, the control apparatus 7 enables determination of the offset (the distance) $x_{offset}$ in the x direction and the offset (the distance) $y_{offset}$ in the y direction, of the current position of the automated guided vehicle 1 relative to the desired target position; this is represented by Step C1 of the flow diagram of FIG. 4.

Having the length difference between the first distance a and the second distance b, the control apparatus 7 now determines the direction of travel which the automated guided vehicle 1 should take in order to reach the target position. In the case of the present exemplary embodiment, a straight line (translational) movement of the automated guided vehicle 1 is superimposed on a first rotational movement; this is represented by Step D1 of the flow diagram of FIG. 4. The magnitude of the aforesaid length difference determines what the magnitude of the first rotational movement should be.

In the case of the present exemplary embodiment, the first rotational movement is reversed after a predetermined interval of time, i.e. the direction of the rotary movement is changed in order to, in particular, bring the automated guided vehicle 1 as quickly as possible into an alignment centered under the cargo trailer 10, and, at the same time, to prevent an oscillation of the movement. As a result, the automated guided vehicle 1 then travels with a second rotary movement, in particular for a second time interval. This is illustrated in FIG. 3.

In the case of the present exemplary embodiment, the translational movement of the automated guided vehicle 1 proceeds at a constant speed, $v_{trans}$. On the other hand, in the case of the present exemplary embodiment, the speed $v_{rot}$ of the rotational movement depends on the distance $h_c$ of the automated guided vehicle 1 from the line joining the two forward edges 14a, 14b and on the offset (the distance) $y_{offset}$ in the y direction of the current position of the automated guided vehicle 1 relative to the desired target position. In particular, the speed $v_{rot}$ of the first rotational movement is greater the greater the distance $h_c$ of the automated guided vehicle 1 from the line joining the two forward edges 14a, 14b and the greater the offset (the distance) $y_{offset}$ in the y direction of the current position of the automated guided vehicle 1 relative to the desired target position. The initial direction of the first rotational movement depends on the current offset $y_{offset}$ in the y direction of the current position of the automated guided vehicle 1 relative to the desired target position, and possibly on the current orientation of the automated guided vehicle 1. In particular, it is provided that the automated guided vehicle 1 first moves with the superposed first rotational movement being in the counterclockwise direction, when in the direction of sight to the trailer 10 the automated guided vehicle 1 is displaced to the right in the y direction with respect to the target position. Otherwise, the automated guided vehicle 1 first moves with the superposed first rotational movement being in the counterclockwise direction.

The trailer 10 may have, e.g., two groups of "feet" or rods, which preferably are aligned in the longitudinal direction of the trailer 10. Thus, as characteristic features, the edges of the rods, or the edges of the "feet", which edges are directed toward the trailer coupling means 13, form two groups of characteristic features.

Figure 3:
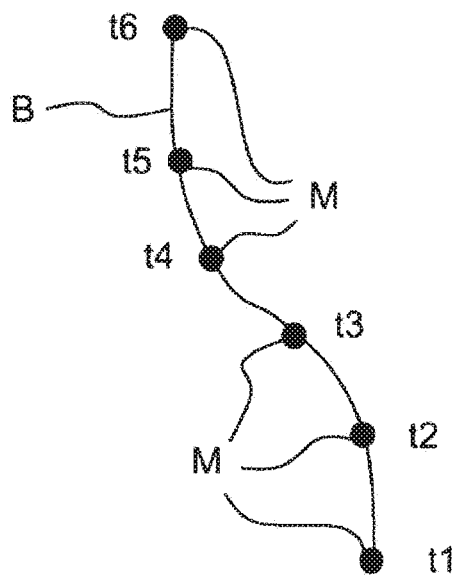
FIG. 3 is a diagram which illustrates movement of the automated guided vehicle.

FIG. 3 illustrates the automatic movement of the automated guided vehicle 1. The center point M of the automated guided vehicle 1 is shown, at various points in time, t1 to t6, and the path B along which the automated guided vehicle 1 is automatically moved is also shown.

At time t1, the automated guided vehicle 1 is located at its current position, and, as described above, the speed $v_{rot}$ and direction of the first rotational movement are calculated. In the case of the present exemplary embodiment, the initial movement of the automated guided vehicle 1 comprises a counterclockwise rotation, for a prescribed constant duration, until time t3. At time t3, the direction of the rotational movement is reversed, and the automated guided vehicle 1 is automatically moved, until time point t6.

In the case of the present exemplary embodiment, it is provided that the time durations (intervals) during which the automated guided vehicle 1 moves, in both directions, are the same. At the same time, the speeds $v_{rot}$ of the rotational movements are different, and depend on the current distance $h_c$ from the automated guided vehicle 1 to the line connecting the two forward edges 14a, 14b, and on the offset (the distance) $y_{offset}$ in the y direction of the current position of the automated guided vehicle 1 relative to the desired target position.

At the position at which the automated guided vehicle 1 is located at time t6, by means of its distance measuring device 7 the automated guided vehicle 1 automatically seeks to redetermine the two characteristic features, and repeats Steps B1 to D1, until a prescribed termination criterion is satisfied, i.e. until the automated guided vehicle has sufficiently closely attained the target position.

At the geometrically determined target position, the automated guided vehicle 1 will be disposed under the cargo trailer 10 in such a way that the coupling means of the tractor, which means is configured, e.g., designed, for example, as an extended lifting device, meets the associated coupling means 13 of the trailer 10. Under these circumstances, depending on the prior movement, it is possible that the automated guided vehicle 1 may be slightly rotated under the trailer 10. As the criterion for termination of the process, in the case of the present exemplary embodiment, one may utilize the positions (and orientations) of the laser beams, i.e. the lengths of the first distance a and the second distance b on a circle with radius r around the center point M of the automated guided vehicle 1, and defined by the center point of the laser scanner or the distance measuring device 7. The movement of the automated guided vehicle 1 will be stopped when the equation of a circle $$r^2 = x^2 + y^2$$

is satisfied for a desired offset (distance) $x = x_{offset,desired}$ in the x direction and a desired offset (distance) $y = y_{offset,desired}$ in the y direction.

Figure 5:
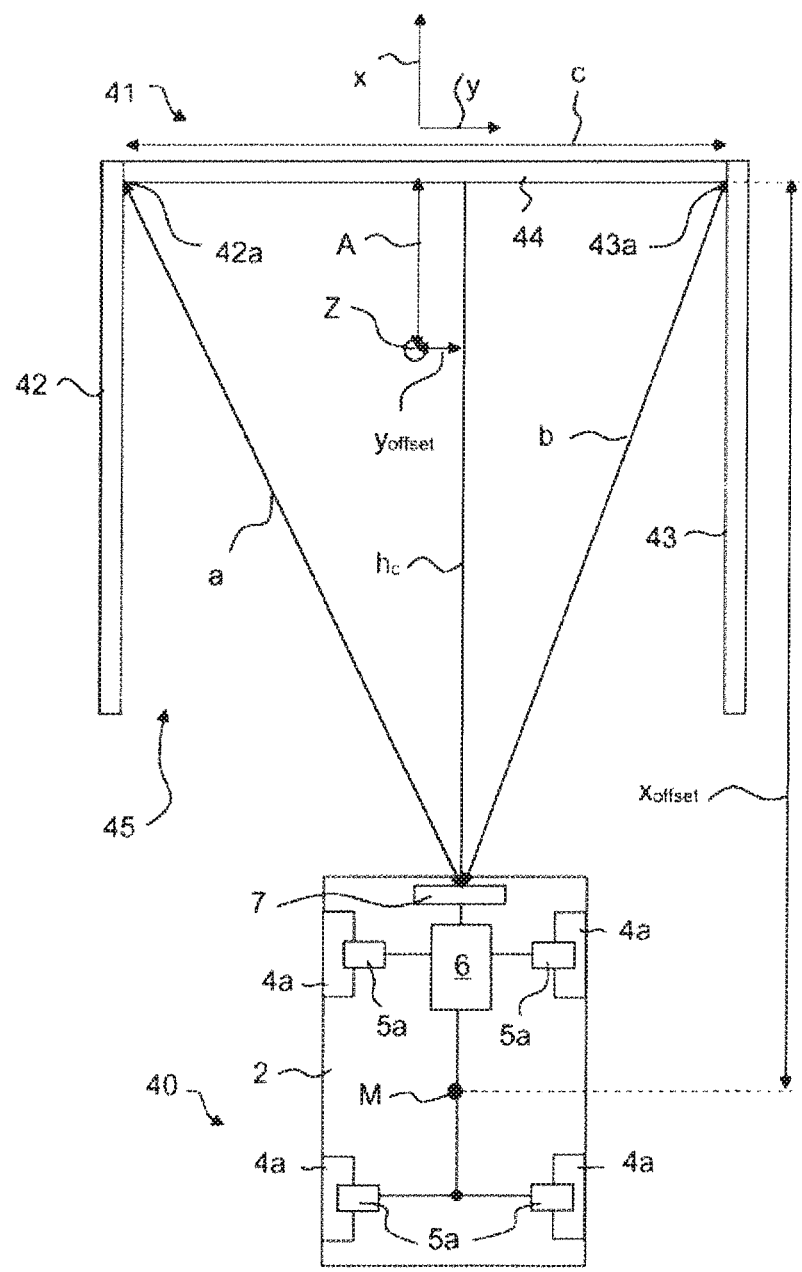
FIG. 5 is a plan view of a second automated guided vehicle, along with an autoclave.

FIG. 5 illustrates a plan view of a second automated guided vehicle 40, which may be employed in place of the automated guided vehicle 1 shown in FIGS. 1 and 2. If not otherwise described below, the components of the automated guided vehicle 40 illustrated in FIG. 5 which have essentially the same structures and functions as the corresponding components illustrated in FIGS. 1 and 2 have been labeled with the same reference numerals.

The automated guided vehicle 40 illustrated in FIG. 5 differs from the automated guided vehicle 1 illustrated in FIGS. 1 and 2 basically in that it is in the form of an omnidirectionally movable (holonomic) automated guided vehicle 40.

In the case of this (second) exemplary embodiment, instead of the wheels 3 and the additional wheels 4, the automated guided vehicle 40 is provided with "omnidirectional wheels" 4a attached to the vehicle body 2 by means of, e.g., special suspensions; these wheels 4a may also be referred to as Mecanum wheels. Such wheels have, e.g., a rotatably mounted circular rim on which a plurality of un-driven roller bodies are (rotatably) mounted. The rim itself may be driven by drive means. In the case of this (second) exemplary embodiment, each of the wheels 4a is driven by an electrical drive. These drives are preferably controlled electrical drives, which are connected to the control apparatus 6.

As mentioned above, the automated guided vehicle 40 illustrated in FIG. 5 may be used in place of the automated guided vehicle 1 illustrated in FIGS. 1 and 2. In the case of this (second) exemplary embodiment, in addition it is provided that the automated guided vehicle 40 works with an autoclave which is also illustrated in FIG. 5. This autoclave is an example of a space which is designed such that the automated guided vehicle 40 will be automatically moved into it. (It is also possible to employ the automated guided vehicle 1 illustrated in FIGS. 1 and 2, in this application.)

In the case of this (second) exemplary embodiment, the autoclave 41 has a rear wall 44, a first side wall 42, and a second side wall 43. The first side wall 42 and the rear wall 44 form a first rear corner 42a, and the second side wall 43 and the rear wall 44 form a second rear corner 43a. The forward edges of the two side walls 42, 43 border an opening 45 of the enclosed area, which can be opened and closed by a gate (not shown) or a roller door (tambour door) (also not shown). The autoclave 41 further is comprised of a roof (not illustrated), which also borders the forwardly directed opening 45.

When the automated guided vehicle 41 is located ahead of the autoclave 41 (i.e. ahead of the opening 45 in the autoclave 41), the distance measuring device 7 will be able to detect the two rear corners 42a, 3a.

The two side walls 42, 43 extend in the longitudinal direction (the x direction), and the rear wall 44 extends in the transverse direction (y direction). The two side walls 42, 43 are mutually parallel, and are oriented at right angles to the rear wall 44. The two side walls 42, 43 extend over the same "depth", i.e. they have the same length in the x direction.

When the automated guided vehicle 41 is located ahead of the opening 45 in the autoclave 41, it is possible, by means of the distance measuring device 7, to determine a first distance a and a second distance b. The first distance a is the distance between the automated guided vehicle 40 and the first rear corner 42a, or between the distance measuring device 7 and the first rear corner 43a. The second distance b is the distance between the automated guided vehicle 40 and the second rear corner 42a, or between the distance measuring device 7 and the second rear corner 43a.

In the case of this (second) exemplary embodiment, it is provided that the automated guided vehicle 40 automatically travels into the autoclave 41, and arrives at a target position Z. Thus, the automated guided vehicle 40 is designed to automatically travel to the prescribed target position Z relative to the autoclave 41, and in particular at said target position the automated guided vehicle assumes a prescribed orientation relative to the enclosed area 41. This process proceeds as follows in the case of this (second) exemplary embodiment:

First, the automated guided vehicle 40 is moved to a position ahead of the opening 45 of the autoclave 41, preferably in a manner such that it is moved automatically into a predetermined position. This position is reached by the automated guided vehicle 40 propelling itself, e.g., by means of a program installed on the control device 6. The predetermined position is selected such that the automated guided vehicle 40 can detect two characteristic features of the enclosed area 41 by means of its distance measuring device 7. In the case of this (second) exemplary embodiment, these two characteristic features are the two rear corners 42a, 43a.

When the automated guided vehicle 40 reaches the position in question, it automatically seeks out the two characteristic features with its distance measuring device 7 (namely, in the case of this (second) exemplary embodiment, the two rear corners 42a, 43a), and determines the first distance a and the second distance b (namely the distances to the two rear corners 42a, 43a). This also enables determination of the distance $h_c$ from the automated guided vehicle 1 to the rear wall 44.

Using the first distance a, the second distance b, and the distance c between the two side walls 42, 43, in the case of this (second) exemplary embodiment, with the control apparatus 7, it is possible to determine the offset (the distance) $x_{offset}$ in the x direction and the displacement (the distance) $y_{offset}$ in the y direction, of the current position of the automated guided vehicle 1 relative to the desired target position P.

Using the difference in length between the first distance a and the second distance b, the control apparatus 7 now determines the direction of travel which the automated guided vehicle 40 should take in order to reach the target position Z. In the case of this (second) exemplary embodiment, a straight line movement (translational movement) of the automated guided vehicle 1 is superposed over a first rotational movement, corresponding to the automatic movement of the automated guided vehicle 1. The magnitude of the abovementioned length difference determines the magnitude of the first rotational movement. In the case of this (second) exemplary embodiment, after a prescribed first time interval, the first rotational movement is reversed, i.e. the direction of the rotational movement is changed.

In the case of this (second) exemplary embodiment, the translational movement of the automated guided vehicle 40 has a constant speed, $v_{trans}$. The speed of the rotational movement, $v_{rot}$, in the case of this (second) exemplary embodiment, depends on the distance $h_c$ between the automated guided vehicle 1 and the rear wall 44, and on the offset (distance) $y_{offset}$ in the y direction from the current position of the automated guided vehicle 1 to the desired target position Z. In particular, the speed $v_{rot}$ of the first rotational movement is greater the greater the distance $h_e$ from the automated guided vehicle 1 to the rear wall 44, and the greater the offset (the distance) $y_{offset}$ in the y direction between the current position of the automated guided vehicle 1 and the target position Z. The initial direction of the first rotational movement depends on the current offset (distance) $y_{offset}$ in the y direction from the current position of the automated guided vehicle 1 to the desired target position Z, and possibly also on the current orientation of the automated guided vehicle 1. In particular, it is provided that the automated guided vehicle 40 moves first with the superposed rotational movement in the counterclockwise direction, if in the direction of sight to the rear wall 44 the automated guided vehicle 40 is located at a rightward displacement in the y direction with respect to the target position Z. Otherwise, the automated guided vehicle 40 first moves with the superposed rotational movement being in the counterclockwise direction. After the first time interval, the automated guided vehicle 40, for the duration of the second time interval, moves farther in translational movement, with a second rotational movement being superposed, the direction of which second rotational movement is the opposite of the direction of the first rotational movement.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method of operating an automated guided vehicle which is to be moved automatically under its own power by a control apparatus of the automated guided vehicle to a target position relative to an object, wherein the object has two characteristic features and wherein the target position lies on a connecting line between the two characteristic features or is located at a distance from the connecting line, the method comprising:
   (a) moving the automated guided vehicle by the control apparatus to a position at which the automated guided vehicle is capable of determining, with a distance measuring device of the automated guided vehicle, a first distance between the current position of the automated guided vehicle and the first characteristic feature, and a second distance between the current position of the automated guided vehicle and the second characteristic feature;
   (b) determining the first distance and the second distance with the distance measuring device;
   (c) automatically moving the automated guided vehicle by the control apparatus for a predetermined first time interval in a translational movement upon which a first rotational movement is superposed, wherein the direction of the first rotational movement depends on the first distance and the second distance;
   (d) following expiration of the first time interval, automatically moving the automated guided vehicle by the control apparatus for a predetermined second time interval with a translational movement upon which a second rotational movement is superposed, wherein the second rotational movement is in a direction opposite to the first rotational movement; and
   (e) repeating steps (b) through (d) until a termination condition is satisfied;
   wherein the termination criterion is defined by the lengths of the first distance and the second distance on a circle with radius (r) around the center point of the automated guided vehicle and through the center point of the distance measuring device, wherewith the automated guided vehicle stops automatically when the equation of the circle:

$$r^2 = x^2 + y^2$$

is satisfied for a first desired offset $x = x_{offset,desired}$ and a second desired offset $y = y_{offset,desired}$, wherein the first desired offset represents a maximum allowed distance from the automated guided vehicle to the target position parallel to the connecting line, and the second desired offset represents a maximum allowed distance from the automated guided vehicle to the target position perpendicular to the connecting line.

2. The method of claim 1, wherein at least one of:
   the first time interval is equal to the second time interval;
   the speed of the translational movement is constant; or
   the distance between the target position and the first characteristic feature is equal to the distance between the target position and the second characteristic feature.

3. The method of claim 1, further comprising:
   determining a first offset between the current position of the automated guided vehicle and the target position in the direction of the connecting line; and
   selecting the direction of the first rotational movement depending on the determined first offset such that the direction of the first rotational movement is in the direction of the target position.

4. The method of claim 3, wherein the speed of at least one of the first rotational movement or the second rotational movement depends on at least one of the magnitude of the first offset or the magnitude of a distance from the automated guided vehicle to the connecting line.

5. The method of claim 4, wherein the speed of at least one of the first rotational movement or the second rotational movement depends on the orientation of the automated guided vehicle in the current position relative to the target position.

6. The method claim 1, wherein:
   the object is in the form of a cargo trailer comprising a trailer coupling configured to be releasably connected to a corresponding tractor coupling of the automated guided vehicle; and
   the cargo trailer further comprises two vertical rods extending in a longitudinal direction of the cargo trailer, wherein the two characteristic features comprise edges of the rods that are directed toward the trailer coupling.

7. The method of claim 6, wherein the position of the trailer coupling is associated with the target position.

8. The method of claim 1, wherein:
   the object is in the form of an autoclave having a rear wall, a first side wall, and a second side wall parallel to the first side wall, wherein the rear wall is disposed perpendicularly to the side walls, the first side wall and the rear wall form a first rear corner, the second side wall and the rear wall form a second rear corner, and forward edges of the two side walls which are directed away from the rear wall form an opening in the autoclave, through which opening the automated guided vehicle is automatically moved into the autoclave; and
   the two rear corners form the two characteristic features.

9. An automated guided vehicle, comprising:
   a vehicle body having a plurality of wheels disposed on the vehicle body;
   a drive associated with at least one of the wheels;
   a distance measuring device; and
   a control apparatus operatively coupled with the distance measuring device and the drive to operate the automated guided vehicle according to the method of claim 1.

* * * * *